Patented Aug. 22, 1933

1,923,957

UNITED STATES PATENT OFFICE 1,923,957

ACCELERATOR OF VULCANIZATION

Jan Teppema, Akron, Ohio, assignor to The Goodyear Tire & Rubber Company, Akron, Ohio, a Corporation of Ohio No Drawing. Original application December 10, 1927, Serial No. 239,266. Divided and this application March 9, 1929, Serial No. 345,898

17 Claims. (Cl. 18—53)

My invention, which in a broad sense relates to the treatment of rubber, has particular relation to a method whereby the vulcanization of a rubber compound may be hastened or accelerated. It has for one of its objects the provision of a new class of vulcanization accelerators for rubber compounds; for another, the provision of an accelerator composition which may be manufactured inexpensively and which may be readily incorporated into rubber upon the rolls of a mill without danger of scorching. A further object of the invention is to provide a vulcanization accelerator composed of the reaction product of an organic sulphide and a 2-halogen thiazole or substitution products of a 2-halogen thiazole. This application is a division of my prior application Serial No. 239,266, filed December 10, 1927, for "Accelerator of vulcanization" which matured on May 6, 1930, into United States Letters Patent No. 1,757,930.

It has been observed heretofore that certain thiazole compounds, for example, mercaptobenzothiazole,

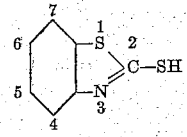

when incorporated into a vulcanizable rubber compound, greatly accelerate the rate of vulcanization of the latter. The resulting products have a high degree of tensile strength and elasticity. My invention is predicated upon the discovery that certain related thiazole compounds having the structural formula

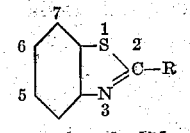

in which R represents a halide, of which 2-chlor benzothiazole is an example, may be caused to react with alkali metal salts of organic sulphides, for example, the sodium salt of diethyl dithiocarbamate, to produce materials having excellent accelerative properties.

The first mentioned material, as exemplified herein by 2-chlor benzothiazole, may be conveniently prepared by the following method:

Dissolve 200 parts of crude mercaptobenzothiazole in 400 parts of pentachlorethane and then bubble chlorine gas through this solution for a period of several hours while the solution is being heated under a reflux condenser. Chlorination should continue preferably from five to seven hours, although this period may be shortened or increased somewhat at the will of the operator. However, the longer periods of chlorination result in a more complete reaction. The reaction product is then distilled and the fraction boiling at a temperature of from 240° C. to 252° C. is separated from the remainder and represents the major portion of the reaction product of chlorine and mercaptobenzothiazole.

The 2-halogen benzothiazole prepared by the preceding method may be caused to react with various dithiocarbamates to produce excellent accelerators for rubber compounds. The reaction product of 2-chlor benzothiazole and the sodium salt of diethyl dithiocarbamate is an example of a material of this class which has been found to be very efficient.

The following method may be employed in the manufacture of this reaction product.

Dissolve 133 grams of 2-chlor benzothiazole and 120 grams of sodium diethyl dithiocarbamate in 500 cc. of ethyl alcohol and reflux the solution for a period of six hours. The alcohol is then distilled off preferably under reduced pressure and the reaction product, remaining in the form of a residual oil, is washed with water. The material may then be dried with anhydrous calcium chloride ($CaCl_2$) and filtered. The oil when distilled at a pressure of five mm. of mercury yields a light yellow oil which is a non-accelerator and a resinous residue which is an accelerator.

The invention is not limited to the reaction product of 2-chlor benzothiazole with the alkali metal salts of dithiocarbamates, but it also includes the substituted chlor-thiazoles; for example, 6-nitro 2-chlor benzothiazole. The latter substance may be caused to react with diethyl dithiocarbamate by dissolving 35 grams of 6-nitro 2-chlor benzothiazole in alcohol, heating the solution to boiling and adding 30 grams of sodium diethyl dithiocarbamate. After the solution has boiled for a period of from five to ten minutes it solidifies as a yellow mass. The vessel containing the mass is exposed to the heat of a small flame for a period of an hour and is then cooled. The reaction product precipitates as a crystalline material which should be washed with water to remove any sodium chloride formed during the reaction. The crystalline material may be further purified by recrystallizing it from boiling alcohol, from which it precipitates in form of yellow needles having a melting point of from 120 to 122 degrees C.

The invention also includes the reaction products of 2-halogen thiazoles with various dithiocarbamates other than diethyl dithiocarbamate. Specific examples of these materials are the reaction products of 2-chlor benzothiazole with the alkali metal piperidyl dithiocarbamates (semisolid oily substances), the reaction product of chlor benzothiazole with sodium dibenzyl dithiocarbamate (a dark oily material), the reaction product of sodium piperidyl dithiocarbamate with 2-chlor 6-nitrobenzothiazole (a crystalline substance having a melting point of 151–155° C.) and the reaction product of sodium dibenzyl dithiocarbamate with 2-chlor 6-nitrobenzothiazole (a light yellow solid having a melting point of 141–142° C.)

All of these materials may be prepared by methods similar to those employed in the preparation of the reaction product of 2-chlor benzothiazole and diethyl dithiocarbamate. The compounds so prepared may be employed as accelerators in most of the standard rubber compounds. The following is an example of a formula in which excellent results are obtained when any of the substances above mentioned are employed as accelerators:

| | Parts |
|---|---|
| Extracted rubber | 100 |
| Zinc oxide | 5 |
| Sulphur | 3 |
| Stearic acid | 1.5 |
| Accelerator | .5 |

Samples of compounded rubber made up in accordance with this formula were subjected to vulcanization by steam heat in a mold after which they were subjected to physical tests to ascertain their elasticities and tensile strengths. The results of these tests are contained in the following tables:

*Reaction product of 2-chlor benzothiazole and sodium diethyl dithiocarbamate*

| Cure | Load in kgs/cm² at 700% elong. | Tensile strength kgs/cm² | Percent elong. |
|---|---|---|---|
| :20 at 20# | 95 | 180 | 810 |
| :45 at 20# | 164 | 230 | 760 |
| :30 at 40# | 85 | 165 | 800 |

*Reaction product of 2-chlor 6-nitrobenzothiazole and sodium diethyl dithiocarbamate*

| :20 at 20# | 165 | 200 | 710 |
|---|---|---|---|

*Reaction product of sodium piperidyl dithiocarbamate and 2-chlor benzothiazole*

| Cure | Load in kgs/cm² at 500% elong. | Load in kgs/cm² at 700% elong. | Tensile strength kgs/cm² | Percent elong. |
|---|---|---|---|---|
| :20 at 20# | 9 | 21 | 60 | 935 |
| :45 at 20# | 16 | 50 | 135 | 875 |
| 1:10 at 20# | 18 | 58 | 150 | 865 |
| :30 at 40# | 15 | 43 | 125 | 880 |

*Reaction product of sodium dibenzyl dithiocarbamate and 2-chlor benzothiazole*

| :20 at 20# | 7 | 15 | 35 | 860 |
|---|---|---|---|---|
| :45 at 20# | 22 | 76 | 170 | 840 |
| 1:10 at 20# | 27 | 99 | 190 | 810 |
| :30 at 40# | 22 | 66 | 145 | 845 |

*Reaction product of sodium piperidyl dithiocarbamate and 2-chlor 6-nitro benzothiazole*

| Cure | Load in kgs/cm² at 500% elong. | Load in kgs/cm² at 700% elong. | Tensile strength kgs/cm² | Percent elong. |
|---|---|---|---|---|
| :20 at 20# | 40 | 200 | 205 | 705 |
| :45 at 20# | 47 | 186 | 190 | 705 |
| 1:10 at 20# | 43 | 173 | 205 | 730 |
| :30 at 40# | 33 | 116 | 180 | 770 |

*Reaction product of sodium dibenzyl dithiocarbamate and 2-chlor 6-nitro benzothiazole*

| | 300% elong. | 500% elong. | | |
|---|---|---|---|---|
| :20 at 20# | 50 | 200 | 235 | 730 |
| :45 at 20# | 46 | 178 | 235 | 750 |
| 1:10 at 20# | 40 | 159 | 205 | 745 |
| :30 at 40# | 27 | 88 | 180 | 815 |

It will be apparent from the preceding tables that the use of these accelerators results in rapid cures at comparatively low temperatures, the vulcanized products having excellent physical properties both with regard to tensile strength and elongation.

In the preceding examples, specific reference has been made only to the reaction products of 2-chlor benzothiazole with the sodium salts of the dithiocarbamates. In each case, the 2-brom benzothiazole may be substituted for the chlor thiazoles and the potassium or other salts of the dithiocarbamates may be substituted in lieu of the sodium salt.

Although I have described in detail only the preferred embodiments of the invention, it will be apparent to those skilled in the art that it is not so limited but that various minor modifications may be made therein without departing from the spirit of the invention or from the scope of the appended claims. It is intended that the patent shall cover, by suitable expression in the appended claims, whatever features of patentable novelty reside in the invention.

What I claim is:

1. A method of treating rubber which comprises vulcanizing it in the presence of a material having the structural formula

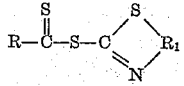

in which R represents a piperidyl radical and $R_1$ represents an aryl group.

2. A method of treating rubber which comprises vulcanizing it in the presence of a material having the structural formula

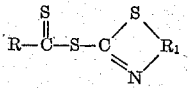

in which R represents a piperidyl radical and $R_1$ represents a benzenoid group.

3. A method of treating rubber which comprises vulcanizing it in the presence of the reaction product of a 2-halogen aryl thiazole and a piperidyl dithiocarbamate.

4. A rubber product that has been vulcanized in the presence of a material having the structural formula

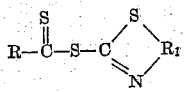

in which R is a piperidyl radical and R₁ is a benzenoid group.

5. A rubber product that has been vulcanized in the presence of the reaction product of sodium piperidyl dithiocarbamate and a 2-halogen benzothiazole.

6. A method of treating rubber which comprises incorporating therein a material having the formula

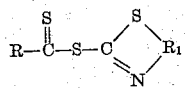

in which R represents a piperidyl radical and R₁ represents a benzenoid group.

7. A rubber product that has been vulcanized in the presence of a 2-piperidyl carbamyl thiazyl sulphide.

8. A method of treating rubber which comprises subjecting it to vulcanization in the presence of a material having the formula:

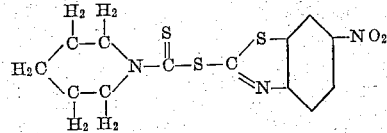

9. A rubber product that has been vulcanized in the presence of a material having the formula

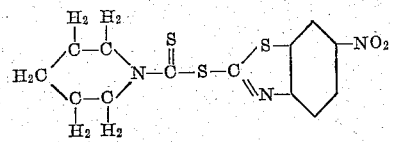

10. A method of treating rubber which comprises subjecting it to vulcanization in the presence of a material having the formula

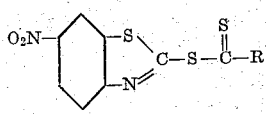

in which R is an amino group having the nitrogen atom thereof directly attached to the disubstituted carbon atom.

11. A method of treating rubber which comprises vulcanizing it in the presence of a material having the structural formula

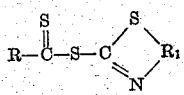

in which R represents a piperidyl radical and R₁ represents a nitro-substituted aryl group.

12. A method of treating rubber which comprises vulcanizing it in the presence of a material having the structural formula

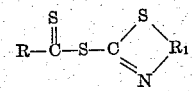

in which R represents a piperidyl radical and R₁ represents a nitro-substituted benzene group.

13. A rubber product that has been vulcanized in the presence of a material having the structural formula

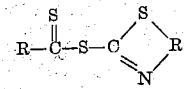

in which R is a piperidyl radical and R₁ is a nitro-substituted aryl group.

14. A rubber product that has been vulcanized in the presence of a material having the structural formula

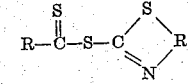

in which R is a piperidyl radical and R₁ is a nitro-substituted benzene group.

15. A method of treating rubber which comprises incorporating therein the reaction product of sodium piperidyl dithiocarbamate and a 2-halogen benzothiazole.

16. A method of treating rubber which comprises incorporating therein a 2-piperidyl carbamyl thiazyl sulphide.

17. A method of treating rubber which comprises vulcanizing in the presence of the reaction product of a 2-halogen nitro aryl thiazole and a piperidyl dithiocarbamate.

JAN TEPPEMA.